(12) United States Patent
Zhang et al.

(10) Patent No.: US 11,863,769 B2
(45) Date of Patent: Jan. 2, 2024

(54) BANDWIDTH SAVING ARCHITECTURE FOR SCALABLE VIDEO CODING

(71) Applicants: Advanced Micro Devices, Inc., Santa Clara, CA (US); ATI Technologies ULC, Markham (CA)

(72) Inventors: Lei Zhang, Richmond Hill (CA); Ji Zhou, Shanghai (CN); Zhen Chen, Shanghai (CN); Min Yu, Shanghai (CN)

(73) Assignees: Advanced Micro Devices, Inc., Santa Clara, CA (US); ATI Technologies ULC, Ontario (CA)

( * ) Notice: Subject to any disclaimer, the term of this patent is extended or adjusted under 35 U.S.C. 154(b) by 0 days.

(21) Appl. No.: 17/403,191

(22) Filed: Aug. 16, 2021

(65) Prior Publication Data

US 2021/0377552 A1 Dec. 2, 2021

Related U.S. Application Data

(63) Continuation of application No. 16/706,297, filed on Dec. 6, 2019, now Pat. No. 11,095,910, which is a
(Continued)

(51) Int. Cl.
*H04N 19/159* (2014.01)
*H04N 19/117* (2014.01)
(Continued)

(52) U.S. Cl.
CPC ......... *H04N 19/423* (2014.11); *H04N 19/117* (2014.11); *H04N 19/159* (2014.11);
(Continued)

(58) Field of Classification Search
CPC .......................... H04N 19/423; H04N 19/117
See application file for complete search history.

(56) References Cited

U.S. PATENT DOCUMENTS 6,057,884 A * 5/2000 Chen ........................ H04N 7/52
348/42
6,137,953 A * 10/2000 Fujiwara .............. H04N 9/8042
386/328
(Continued)

FOREIGN PATENT DOCUMENTS

CN 101622878 A 1/2010
CN 101822055 A 9/2010
(Continued)

OTHER PUBLICATIONS

"Low Memory Bandwidth Prediction Method for H.264/AVC Scalable Video Extension"; Huang et al.; Proceedings: APSIPA ASC 2009 : Asia-Pacific Signal and Information Processing Association; 2009 Annual Summit and Conference; Oct. 4, 2009, pp. 294-298 (XP002758902).
(Continued)

*Primary Examiner* — Irfan Habib
(74) *Attorney, Agent, or Firm* — Volpe Koenig

(57) ABSTRACT

A system configured to perform scalable video encoding is provided. The system includes a memory; and a processing unit, wherein the processing unit is configured to: receive inter-layer data and a current picture, wherein the current picture has a base layer; upsample the inter-layer data to generate residual data and reconstruction data, wherein the inter-layer data includes a base mode flag; and encode the current picture to an enhanced layer using the upsampled inter-layer data based on a block type of the base layer and the base mode flag.

20 Claims, 6 Drawing Sheets

Related U.S. Application Data continuation of application No. 16/126,704, filed on Sep. 10, 2018, now Pat. No. 10,659,796, which is a continuation of application No. 13/689,212, filed on Nov. 29, 2012, now Pat. No. 10,085,017.

(51) Int. Cl.
  *H04N 19/187* (2014.01)
  *H04N 19/33* (2014.01)
  *H04N 19/423* (2014.01)
  *H04N 19/80* (2014.01)
  *H04N 19/59* (2014.01)

(52) U.S. Cl.
  CPC ........... *H04N 19/187* (2014.11); *H04N 19/33* (2014.11); *H04N 19/59* (2014.11); *H04N 19/80* (2014.11)

(56) References Cited

U.S. PATENT DOCUMENTS

| | | | | |
|---|---|---|---|---|
| 6,173,013 B1* | 1/2001 | Suzuki | H04N 19/563 | 375/E7.079 |
| 6,356,589 B1* | 3/2002 | Gebler | H04N 19/30 | 375/240.1 |
| 6,697,426 B1* | 2/2004 | Van Der Schaar | H04N 19/34 | 375/E7.095 |
| 6,731,723 B1* | 5/2004 | Garey | H04M 1/6505 | 704/503 |
| 7,535,383 B2* | 5/2009 | Segall | H04N 19/61 | 341/51 |
| 7,593,032 B2 | 9/2009 | Civanlar et al. | | |
| 7,643,560 B2 | 1/2010 | Hong et al. | | |
| 7,876,833 B2* | 1/2011 | Segall | H04B 1/66 | 382/233 |
| 7,933,294 B2 | 4/2011 | Chakareski et al. | | |
| 3,279,260 A1 | 10/2012 | Civanlar et al. | | |
| 8,289,370 B2 | 10/2012 | Civanlar et al. | | |
| 8,290,057 B2* | 10/2012 | Ju | H04N 19/44 | 375/240.22 |
| 8,315,315 B2* | 11/2012 | Amonou | H04N 19/615 | 375/240.27 |
| 8,774,267 B2* | 7/2014 | Gaddy | H04N 13/111 | 375/240.01 |
| 8,861,605 B2* | 10/2014 | Hahn | H04N 19/533 | 382/238 |
| 8,873,637 B2* | 10/2014 | Isani | H04N 19/59 | 375/240.2 |
| 8,938,004 B2* | 1/2015 | Boyce | H04N 19/70 | 375/240.12 |
| 10,547,834 B2* | 1/2020 | Wang | H04N 19/33 | |
| 2005/0013373 A1* | 1/2005 | Lin | H04N 19/70 | 375/240.18 |
| 2005/0185712 A1* | 8/2005 | Lee | H04N 19/146 | 375/E7.145 |
| 2005/0195896 A1* | 9/2005 | Huang | H04N 19/34 | 375/240.03 |
| 2005/0226334 A1* | 10/2005 | Han | H04N 19/523 | 375/E7.125 |
| 2006/0083303 A1* | 4/2006 | Han | H04N 19/577 | 375/E7.129 |
| 2006/0088101 A1* | 4/2006 | Han | H04N 19/31 | 375/240.16 |
| 2006/0132855 A1* | 6/2006 | Dokuni | H04N 1/403 | 358/448 |
| 2006/0153295 A1* | 7/2006 | Wang | H04N 19/107 | 375/E7.187 |
| 2006/0165171 A1* | 7/2006 | Cha | H04N 19/147 | 375/E7.17 |
| 2007/0014349 A1* | 1/2007 | Bao | H04N 19/34 | 375/E7.176 |
| 2007/0098162 A1* | 5/2007 | Shin | H04N 21/2541 | 375/E7.009 |
| 2007/0121723 A1* | 5/2007 | Mathew | H04N 21/2662 | 375/E7.199 |
| 2007/0160301 A1* | 7/2007 | Wang | H04N 19/103 | 375/E7.162 |
| 2007/0171730 A1* | 7/2007 | Ramamoorthy | H03M 13/1515 | 365/185.33 |
| 2008/0131014 A1* | 6/2008 | Lee | H04N 19/184 | 375/E7.184 |
| 2008/0304566 A1* | 12/2008 | Yoon | H04N 19/46 | 375/E7.129 |
| 2009/0097548 A1* | 4/2009 | Karczewicz | H04N 19/93 | 375/240.03 |
| 2009/0097558 A1* | 4/2009 | Ye | H04N 19/46 | 375/E7.076 |
| 2009/0110073 A1* | 4/2009 | Wu | H04N 19/36 | 375/E7.126 |
| 2009/0129467 A1* | 5/2009 | Li | H04N 19/30 | 375/E7.243 |
| 2009/0175333 A1* | 7/2009 | Hsiang | H04N 19/61 | 375/240.18 |
| 2009/0190658 A1 | 7/2009 | Park et al. | | |
| 2009/0190669 A1 | 7/2009 | Park et al. | | |
| 2009/0196350 A1* | 8/2009 | Xiong | H04N 19/176 | 375/240.12 |
| 2009/0304085 A1* | 12/2009 | Avadhanam | H04N 19/117 | 375/240.24 |
| 2010/0014585 A1* | 1/2010 | Bruls | H04N 19/30 | 375/E7.243 |
| 2010/0220787 A1 | 9/2010 | Yamasaki | | |
| 2010/0260260 A1* | 10/2010 | Wiegand | H04N 19/59 | 375/E7.243 |
| 2012/0033040 A1* | 2/2012 | Pahalawatta | H04N 19/156 | 348/43 |
| 2012/0183065 A1* | 7/2012 | Rusert | H04N 19/36 | 375/E7.149 |
| 2012/0288013 A1 | 11/2012 | Pahalawatta et al. | | |
| 2012/0300844 A1* | 11/2012 | Ma | H04N 19/82 | 375/240.16 |
| 2012/0317459 A1* | 12/2012 | Yeo | H03M 13/1154 | 714/763 |
| 2014/0098880 A1 | 4/2014 | Seregin et al. | | |
| 2014/0140399 A1* | 5/2014 | Seregin | H04N 19/30 | 375/240.12 |
| 2014/0146869 A1* | 5/2014 | Zhang | H04N 19/423 | 375/240.01 |
| 2014/0286415 A1* | 9/2014 | Kang | H04N 19/36 | 375/240.12 |
| 2015/0016520 A1* | 1/2015 | Rapaka | H04N 19/176 | 375/240.12 |

FOREIGN PATENT DOCUMENTS

| | | |
|---|---|---|
| CN | 101888555 A | 11/2010 |
| CN | 101911699 A | 12/2010 |
| JP | 2009-502089 T2 | 1/2009 |
| JP | 2010-507937 T2 | 3/2010 |
| JP | 2010-531584 T2 | 9/2010 |
| JP | 2011501568 A | 1/2011 |
| KR | 10-2009-0108077 A | 10/2009 |
| KR | 102294209 B1 | 8/2021 |
| WO | 2013/141596 A1 | 9/2013 |

OTHER PUBLICATIONS

"Memory Efficient Hardware Design for a 3-Spatial Layer SVC Encoder"; Kyujoong Lee et al.; Circuits and Systems (MWSCAS); 2011 IEEE 54th International Midwest Symposium on, IEEE; Aug. 7, 2011; pp. 1-4 (XP031941315).

"Memory Analysis for H.264/AVC Scalable Extension Encoder"; Tzu-Yu Chen et al.; Circuits and Systems, 2009; ISCAS 2009; IEEE International Symposium on; IEEE, Piscataway, NJ, USA; May 24, 2009, pp. 361-364 (XP031479202).

(56) References Cited

OTHER PUBLICATIONS

"Scalable Video Coding—Proposal to Reduce Memory Requirement for MCTF"; Lim et al.; 15th JVT Meeting; Apr. 16, 2005-Apr. 22, 2005; Busan, KR (Joint Video Team of ISO/IEC JTC1/SC29/WG11 and ITU-T SG16 Q.6); No. JVT-O028, Apr. 14, 2005 (XP030005976).

"Efficient Hardware Design for the Upsampling in the H.264/SVC Scalable Video Coding Extension"; Thaisa Leal da Silva, et al.; Very Large Scale Integration (VLSI-SOC); 2009, 17th IFIP International Conference on, IEEE, Oct. 12, 2009; pp. 243-246 (XP032058198).

"An Implementation of Efficient SVC (Scalable Video Coding) Codec", Seung-Yerl Lee et al.; SOC Design Conference (ISOCC), 2009 International, IEEE, Piscataway, NJ, USA, Nov. 22, 2009; pp. 61-62 (XP032193856).

"Joint Scalable Video Model (JSVM) 1.0 Reference Encoding Algorith Description", 71. MPEG Meeting; Jan. 17, 2005-Jan. 21, 2005; Hong Kong; (Motion Picture Expert Group or ISO/IEC JTC1/SC29/WG11), No. N6899, Feb. 14, 2005 (XP030013619).

Schwarz et al., Overview of the Scalable Video Coding Extension of the H.264/AVC Standard, IEEE, Transactions on Circuits and Systems for Video Technology, Sep. 2007, pp. 1103-1120, vol. 17, No. 9.

"Scalable Video Coding Extension of H.264/AVC", Bjelopera et al. ; 54th International Symposium ELMAR-2012 Proceedings; IEEE, Zadar, Croatia; Sep. 12, 2012; pp. 7-12.

H.264/Advanced Video Coding (AVC) Backward-Compatible Bit-Depth Scalable Coding; Gao et al.; IEEE transactions on Circuits and Systems for Video Technology; Apr. 2009; IEEE, Mar. 4, 2009; vol. 19, Issue:4, pp. 500-510.

"1:2 Spatial Scalability Support for HEVC", Hong et al.; Joint Collaborative Team on Video Coding (JCT-VC) of ITU-TSG16 WP3 and ISO/IEC JTC1/SC29/WG11, 4th Meeting: Daegu, KR, Jan. 2011, JCTVC-D202; pp. 1-11.

"Description of the scalable video coding technology proposal" by Canon Research Centre France, Joint Collaborative Team on Video Coding (JCT-VC) of ITU-T SG16 WP3 and ISO/TEC JTC1/SC29/WF11, 11th Meeting: Shanghai, CN, Oct. 2012, JCTVC-K0041, pp. 1-10, 35-47, 52-63.

Spatial Scalability Within the H.264/AVC Scalable Video Coding Extension; C. A. Segall, et al.; IEEE Transactions on Circuits and Systems for Video Technology, Sep. 2007, vol. 17, No. 9, pp. 1121-1135.

\* cited by examiner

BANDWIDTH SAVING ARCHITECTURE FOR SCALABLE VIDEO CODING

CROSS REFERENCE TO RELATED APPLICATIONS

This application is a continuation of U.S. patent application Ser. No. 16/706,297, filed Dec. 6, 2019, which is a continuation of U.S. patent application Ser. No. 16/126,704, filed on Sep. 10, 2018, which issued as U.S. Pat. No. 10,659,796 on May 19, 2020, which is a continuation of U.S. patent application Ser. No. 13/689,212, filed Nov. 29, 2012, which issued as U.S. Pat. No. 10,085,017 on Sep. 25, 2018, which are incorporated by reference as if fully set forth.

FIELD OF INVENTION

The present invention relates to scalable video applications and more specifically to minimizing bandwidth in scalable video applications.

BACKGROUND

Currently, the remote transfer and display of video data using consumer electronics devices has become a field of significant development. Generally, it is desirable to permit such streaming between devices with different display capabilities. With the advent of higher resolution video, it is desirable to compress the video stream to increase the amount of data that can be transferred, yet it is also desirable to permit viewing of such video streams with devices that may only permit lower resolution video streams or may have throughput or slow processing capabilities that render such higher resolution signals impracticable. Thus, scalable video streams are increasing in popularity. In general, a video bit stream is called scalable when parts of the stream can be removed in a way that the resulting substream forms another valid bit stream for some target decoder, and the substream represents the source content with a reconstruction quality that is less than that of the complete original bit stream, but is high when considering the lower quantity of remaining data.

The usual modes of scalability are temporal, spatial, and quality scalability. Spatial scalability (also referred to as spatial resolution) describes cases in which subsets of the bit stream represent the source content with a reduced picture size. Temporal scalability (also referred to as temporal resolution) describes cases in which subsets of the bit stream represent the source content with a reduced frame rate. With quality scalability, the substream provides the same spatial-temporal resolution as the complete bit stream, but with a lower fidelity—where fidelity is often informally referred to as signal-to-noise ratio (SNR). Quality scalability is also commonly referred to as fidelity or SNR scalability.

In systems that support spatial, quality and temporal scalability in real time, memory bandwidth can become a limiting factor in the overall system performance. Thus, the need exists for a way to reduce or eliminate the effects of read/write activity that can increase memory bandwidth issues.

SUMMARY

In some of the embodiments described herein a system and method for scalable video coding includes a first encoding engine for encoding a frame to a first layer resolution that is less than optimal using the frame data, is presented. The first encoding engine generates data for predicting encoding of a frame to an optimal layer resolution. A second encoding engine encodes the frame to a second layer resolution that is greater than first resolution layer. The second encoding engine uses prediction data from the first encoding engine to improve the video compression rate. The system and method in such described embodiments include using less prediction data transferred between the first encoding engine and the second encoding engine, whereby the consumed power can be reduced by the use of less frame data.

In some embodiments, the system and method further include memory in the encoders for storing and retrieving frame and prediction data. Compared to standard AVC, the second encoder utilizes more memory for prediction data, where the added memory is less than one frame of data in the second layer resolution.

BRIEF DESCRIPTION OF THE DRAWINGS

Other aspects, advantages and novel features of the invention will become more apparent from the following detailed description of the invention when considered in conjunction with the accompanying drawings wherein.

DETAILED DESCRIPTION OF THE PREFERRED EMBODIMENTS

Figure 1:
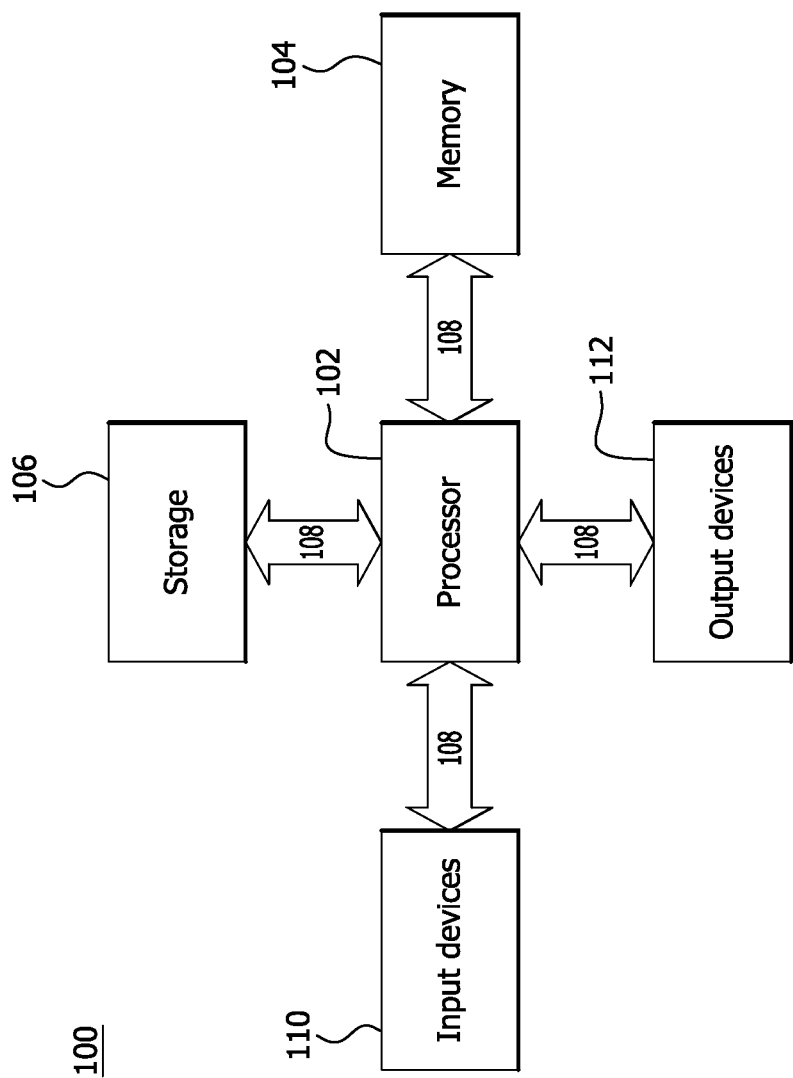
FIG. 1 is a block diagram of a computing system according to the present invention.

Embodiments of the invention as described herein provide a solution to the problems of conventional methods. In the following description, various examples are given for illustration, but none are intended to be limiting. Embodiments include implementing a remote video conferencing system (either wired or wireless) using a standard, non-custom codec. The advantages of these embodiments relate to communications between three or more users having different connection bandwidths and/or different receiving devices, where two or more different resolution displays receive a corresponding video signal from the same user's video source. Exemplary video resolution streams may include, but are not limited to, the following high and low resolution examples representing high and low resolution values for each of the modes of scalability.

|  | Temporal resolution | Spatial resolution | SNR scale |
|---|---|---|---|
| video source at high resolution | 30 fps | 1080p | High quality |
| video source at low resolution | 15 fps | 540p | Low quality |

It may be appreciated by those skilled in the art that while high and low resolution examples for each mode are shown in respective high and low video streams. The modes of scalability may be mixed such that all combinations of the high and low scalability options are possible.

In some embodiments of the present invention, Scalable Video Coding (SVC) embodying the present invention is for net conferencing in which more than 2 users are involved. In the instance that one video source is serving more than one client with different display resolutions, the present invention functions in an environment that sends the video stream with support for these different temporal resolutions and/or spatial resolutions. SVC is also useful for point to point streaming applications, between the user and the server, where the server stores the video in SVC format. The user then can choose among the possible resolutions available according to the bandwidth and receiving device available.

For purposes of this description, "H.264" refers to the standard for video compression that is also known as MPEG-4 Part 10, or MPEG-4 AVC (Advanced Video Coding). H.264 is one of the block-oriented motion-estimation-based codecs developed by the ITU-T Video Coding Experts Group (VCEG) together with the ISO/IEC Moving Picture Experts Group (MPEG).

Included within the features of H.264 is Scalable Video Coding (SVC) that is gaining popularity for video conferencing type applications. A number of industry leading companies have standardized (or support the standard) using SVC in the UCIF (Universal Communications Interop Forum) for video conferencing.

It is expected that the SVC-based video conferencing will be widely adopted. However, SVC, especially the spatial mode of the SVC (i.e. SVC spatial) is quite demanding of memory bandwidth. Reducing the memory Read and Write (R/W) bandwidth and the associated power consumption is desirable to implementing SVC Spatial mode in integrated circuits, such as an ASIC (Application Specific Integrated Circuit), especially in the low-end notebook/Tablet chips. Advantageously, embodiments of the present invention solve these issues by implementing, either alone or together, the following four innovative features:

1. Perform upsampling at the enhanced layer encoder. This can save write bandwidth by up to 75% compared to a conventional approach that separates these tasks.

2. If hardware architecture includes an internal buffer, then use the internal buffer to eliminate data exchange with memory. In this way, point 1 above can be used to also reduce the internal buffer size dramatically.

3. When encoding a 16×16 pixel MicroBlock (MB) of a non-top (meaning less than optimal or not the highest) resolution layer, then only write out inter-layer, intra-reconstructed data or inter-layer, inter-residual data to one buffer according to current MB type. Each entry of this buffer is 16 bits, so that the read Direct Memory Addressing (DMA) of this buffer by enhanced layer is simplified. This is because according to the SVC standard, the data size of reconstructed data is 8 bits, while that of residual data is 9 bits. With this method, the read/write bandwidth is saved by up to ⅓ of the bandwidth achieved from conventional methods.

4. To improve the storage and transferring efficiency, the sign bit is separated from the residual data; 8 bits instead of 16 bits can be used for residual data.

5. To further save memory bandwidth, the inter-layer data written out is optionally compressed using a conventional data compression algorithm, such as, but not limited to, ZIP file format compression.

In the following description, numerous specific details are introduced to provide a thorough understanding of, and enabling description for, embodiments of the implementing low latency applications. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

Computers and other such data processing devices have at least one control processor that is generally known as a control processing unit (CPU). Such computers and processing devices operate in environments which can typically have memory, storage, input devices and output devices. Such computers and processing devices can also have other processors such as graphics processing units (GPU) that are used for specialized processing of various types and may be located with the processing devices or externally, such as, included the output device. For example, GPUs are designed to be particularly suited for graphics processing operations. GPUs generally comprise multiple processing elements that are ideally suited for executing the same instruction on parallel data streams, such as in data-parallel processing. In general, a CPU functions as the host or controlling processor and hands-off specialized functions such as graphics processing to other processors such as GPUs.

With the availability of multi-core CPUs where each CPU has multiple processing cores, substantial processing capabilities that can also be used for specialized functions are available in CPUs. One or more of the computation cores of multi-core CPUs or GPUs can be part of the same die (e.g., AMD Fusion™) or in different dies (e.g., Intel Xeon™ with NVIDIA GPU). Recently, hybrid cores having characteristics of both CPU and GPU (e.g., CellSPE™, Intel Larrabee™) have been generally proposed for General Purpose GPU (GPGPU) style computing. The GPGPU style of computing advocates using the CPU to primarily execute control code and to offload performance critical data-parallel code to the GPU. The GPU is primarily used as an accelerator. The combination of multi-core CPUs and GPGPU computing model encompasses both CPU cores and GPU cores as accelerator targets. Many of the multi-core CPU cores have performance that is comparable to GPUs in many areas. For example, the floating point operations per second (FLOPS) of many CPU cores are now comparable to that of some GPU cores.

Embodiments of the present invention may yield substantial advantages by enabling the use of the same or similar code base on CPU and GPU processors and also by facilitating the debugging of such code bases. While the present invention is described herein with illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Embodiments of the present invention may be used in any computer system, computing device, entertainment system, media system, game systems, communication device, personal digital assistant, or any system using one or more processors. The present invention is particularly useful where the system comprises a heterogeneous computing system. A "heterogeneous computing system," as the term is used herein, is a computing system in which multiple kinds of processors are available.

Embodiments of the present invention enable the same code base to be executed on different processors, such as GPUs and CPUs. Embodiments of the present invention, for example, can be particularly advantageous in processing systems having multi-core CPUs, and/or GPUs, because code developed for one type of processor can be deployed on another type of processor with little or no additional effort. For example, code developed for execution on a GPU, also known as GPU-kernels, can be deployed to be executed on a CPU, using embodiments of the present invention.

An example heterogeneous computing system 100, according to an embodiment of the present invention, is shown in FIG. 1. Heterogeneous computing system 100 can include one or more processing units, such as processor 102. Heterogeneous computing system 100 can also include at least one system memory 104, at least one persistent storage device 106, at least one system bus 108, at least one input device 110 and output device 112.

Figure 2:
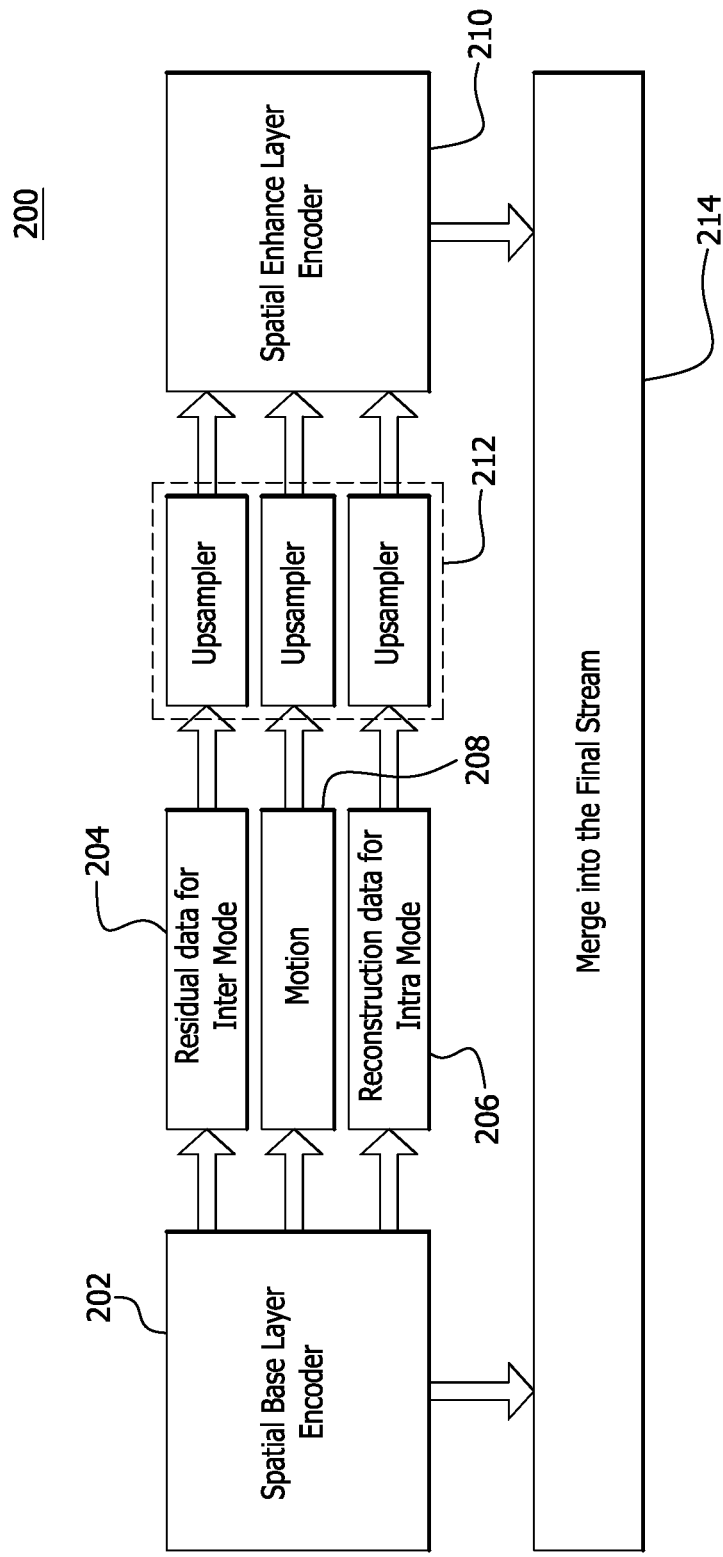
FIG. 2 is a block diagram of a spatial encoding engine according to the present invention.

A processing unit of the type suitable for heterogeneous computing are the accelerated processing units (APUs) sold under the brand name Fusion by AMD of San Jose, CA, according to an embodiment of the present invention as illustrated by FIG. 2. A heterogeneous processing unit includes one or more CPUs and one or more GPUs, such as a wide single instruction, multiple data (SIMD) processor and unified video decoder perform functions previously handled by a discrete GPU. It will be understood that when referring to the GPU structure and function, such functions are carried out by the SIMD. Heterogeneous processing units can also include at least one memory controller for accessing system memory and that also provides memory shared between the GPU and CPU and a platform interface for handling communication with input and output devices through, for example, a controller hub.

A wide single instruction, multiple data (SIMD) processor for carrying out graphics processing instructions may be included to provide a heterogenous GPU capability in accordance with the present invention or a discrete GPU may be included separated from the CPU to implement the present invention; however, as will be understood by those skilled in the art, additional latency may be experienced in an implementation of the present invention using a discrete GPU.

Advantageously, architecture of this type is well suited to provide a solution for implementing Spatial Scale encoding and/or decoding in SVC (scalable video coding). According to H.264 standards, the H.264 implementation of SVC supports spatial, quality and temporal scalability.

The present invention will now be described in terms of supporting spatial scalability to reduce external memory access as an improvement for implementing SVC for both encoder and decoder.

FIG. 2 shows the block diagram of a data flow for a hardware implementation Spatial Scale encoding 200. Initially, the smaller resolution of Base Layer will be encoded by the Base Layer Encoder 202, and at the same time Inter Layer data including, the residual data 204, reconstruction data 206 and motion data 208 will be generated for an Enhance Layer Encoder 210. In embodiments of the present invention,—Encoder 202 performs the functions of the Enhance Layer Encoder 210. Prior to reaching the Enhance Layer Encoder 210, the Inter Layer data is up-sampled by an UPSampler engine 212 to Enhance Layer resolution. Finally, Enhance Layer is estimated by the Enhance Layer Encoder 210 and encoded with up-sampled Inter Layer data information. The outputs of the Base Layer Encoder 202 and the Enhanced Layer Encoder 210 are merged into the final bit stream 214. Then, the Encoders 202 and 210 are merged by time division multiplexing.

Embodiments of the present invention improve the memory bandwidth throughput. As in H.264 spec, the encoder chooses residual or reconstruction data for the Enhance Layer prediction based on the Base Layer Microblock (MB) type. Since these 2 kinds of data are generally mutually exclusive, they are not be used for the same MB. It has been discovered that one can output residual or reconstruction data based on MB_TYPE. If the MB_TYPE is Intra the reconstruction data will be selected, otherwise the residual data will be selected.

Figure 3:
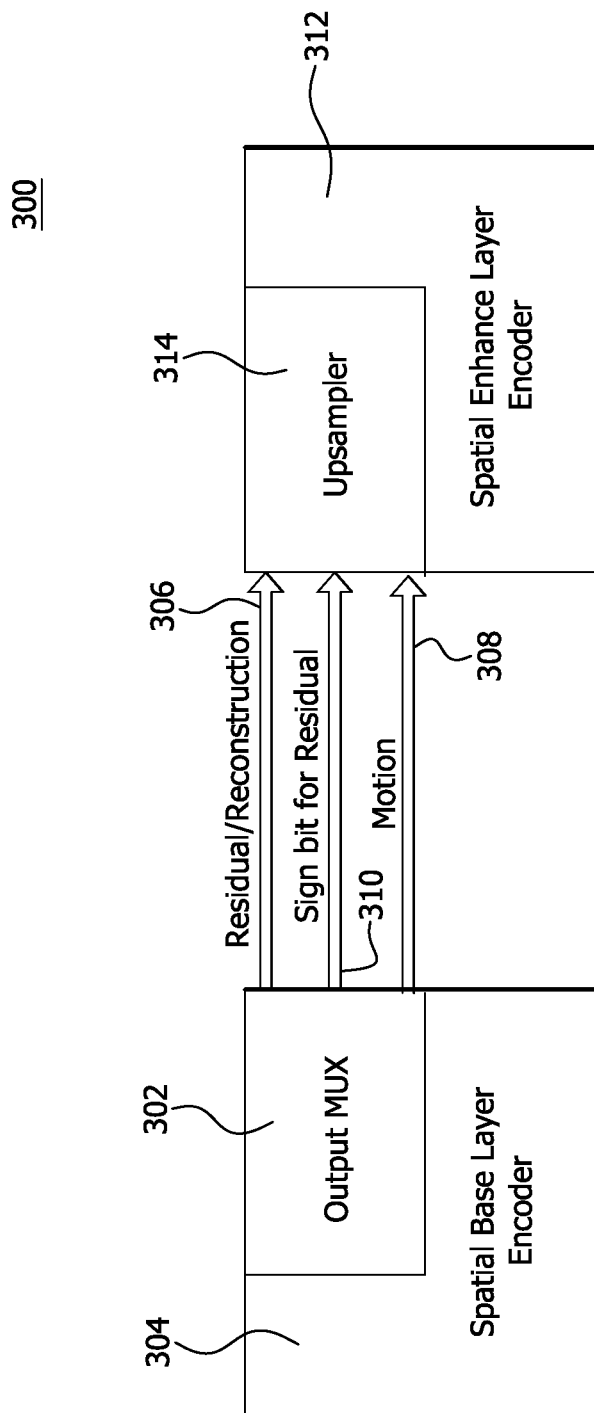
FIG. 3 is a block diagram of a spatial encoder according to the present invention.

Furthermore, it will be appreciated that when a conventional source format is used, such as, but not limited to, the YUV420 source format, the generated residual data is 9-bits each and the reconstruction data is 8-bits each. While the 9-bits of data is not suitable for the storing and transferring data using an 8-bit channel in the memory. It was further realized that the $9^{th}$-bit is a sign bit flag that marks it as residual data and if the sign bit is separated from the residual data, one can use 8 bits instead of 16 bits for residual data. The sign bits are then saved in another location with a reserve of 48 bytes/MB, sufficient to handle this task. With reference to FIG. 3, an embodiment of a spatial encoder 300 includes an output Mux 302 at the output of the Base Layer Encoder 304 which selectively delivers either the residual data or reconstruction data based upon MB_Type. Although, the output Mux may be associated separately from the Base Layer Encoder 304, it will be appreciated by those skilled in the art that the performance of the Output Mux 302 is optimal when included with the Base Layer Encoder 304. Thus, the Inter Layer data is transmitted with one less 8-bit channel as one 8-bit channel 306 delivers the residual data and the reconstruction data along with separate motion data 308 and a residual sign bit channel 310. These more efficient channels then deliver the data to an Enhance Layer Encoder 312 via an Upsampler 314. To further reduce the bandwidth, the up-sampler engine (UPS) 314 in an embodiment is placed in Enhanced Layer encoder 312.

Figure 4:
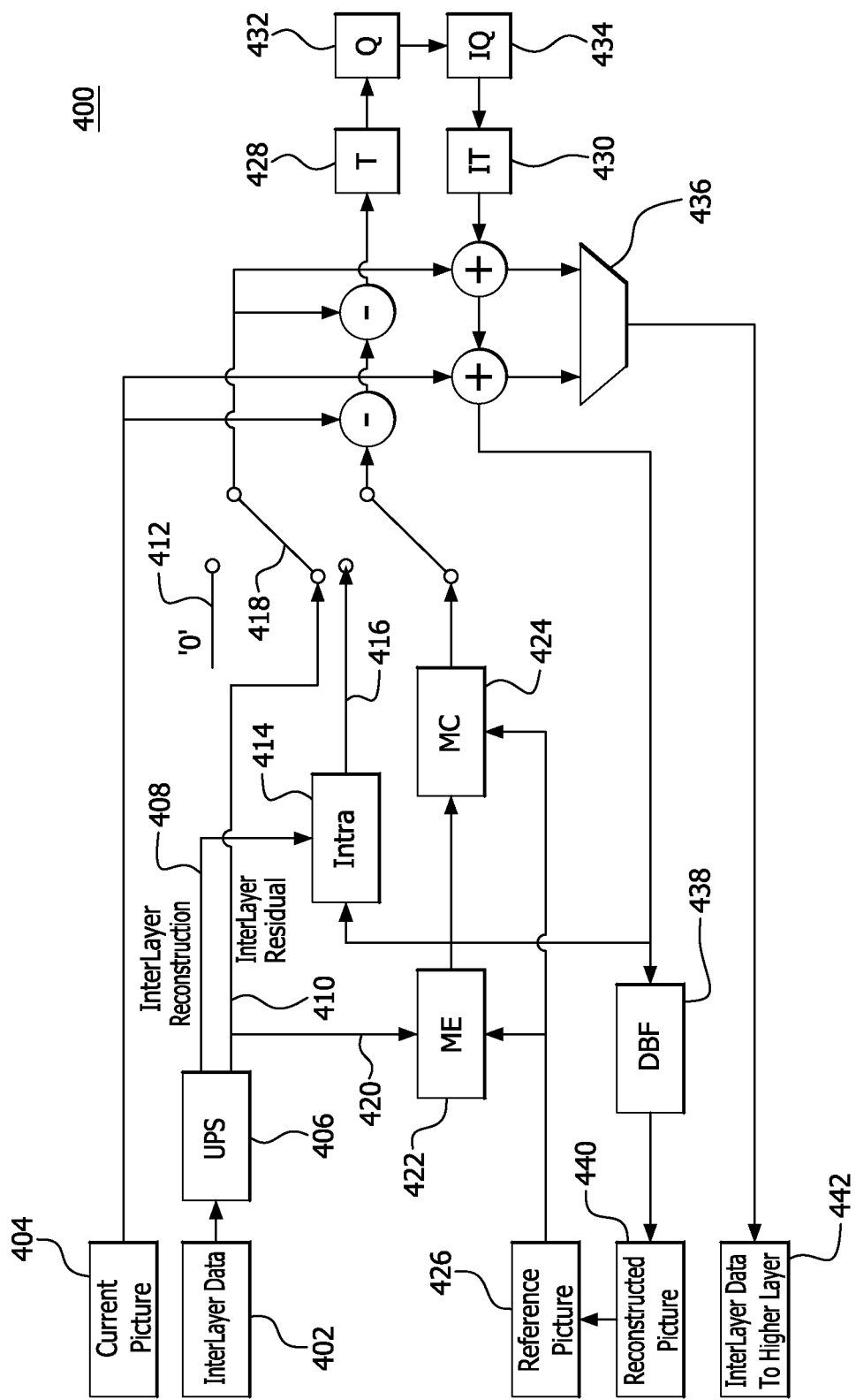
FIG. 4 is a logic diagram of the spatial encoder of FIG. 3 according to the present invention.

With reference to FIG. 4, the data flow for a SVC Spatial Scalability Engine 400 is better understood. The data flow is arrived on understanding of computational requirements and data flow efficiency between the various components. The computational requirements of various functional elements in the H.264 encoder include receiving InterLayer Data 402 and a Current Picture 404. An UPSampler (UPS) 406 for upsampling the InterLayer data 402 and outputting residual data at lead 410 and reconstruction data at lead 408. The UPS engine 406 uses a bi-linear filter to up-sample the corresponding residual data in base layer for current MB, and uses a 4-tap filter to up-sample the reconstruction intra data. Also UPS will up-sample motion vector (MV) 420 for Motion Estimation 422.

Using UPS output, SVC provide 3 inter layer prediction tools for spatial scale. Inter layer Intra Prediction is for Intra mode, and Inter layer Residual Prediction and Inter layer Motion Prediction is for Inter mode. Depending on the MB Type in Base Layer, the following applied:

If MB Type in Base Layer is equal to Intra, the encoding flow is defined in following way:

When the base mode flag is set true, the Inter layer Intra Prediction tool is active. In this mode, residual will be generated by subtracting current MB from the up-sampled base layer reconstruction data. Here the data lead 418 will not be active and the zero data 412 is in used.

When the base mode flag is set false, the standard H.264 intra flow is invoked.

Otherwise, if the MB Type in base layer is equal to Inter, different steps are specified as follows:

When the base mode flag is set to 1, the Inter layer Motion Prediction is active. The base layer MV (which is not shown in the figure) is used as a predictor, MV for current MB is set equal to MV predictor.

When the base mode flag is set to 0 and motion prediction flag is 1, base layer MV is still used as a Predictor but one can set a different (MVD) between current MV and the MV Predictor.

When the base mode flag and the motion prediction flag are both 0, standard H.264 MV prediction is applied and base layer MV will not be used.

When the residual prediction flag is 1, the Inter layer Residual Prediction is active. The final residual will be calculated as current MB subtracting both MC output and the up-sampled base layer Residual 418. To estimate the effect of Residual Prediction, Interlayer Residual provides a lead 420 for ME.

When the residual prediction flag is 0, the base layer Residual is not used and the residual is simply generated by subtracting current MB from MC output.

After that the residual data is subsequently processed by Integer/Inverse integer transform engines 428 and 430 (IT/IIT) and Quantization/Inverse Quantization engines 432 and 434 (Q/IQ) that are then encoded. The output of the encoder is sent to the output Mux 436 and a Deblocking filter (DBF) 438. The reconstructed picture 440 becomes the reference picture 426. The output Mux 436 transmits InterLayer Data to a higher layer 442.

It will be appreciated by those skilled in the art, FIG. 4 does not show all the details for the SVC spatial scale and for more detail one can refer to the H.264 specification identified above.

Figure 5:
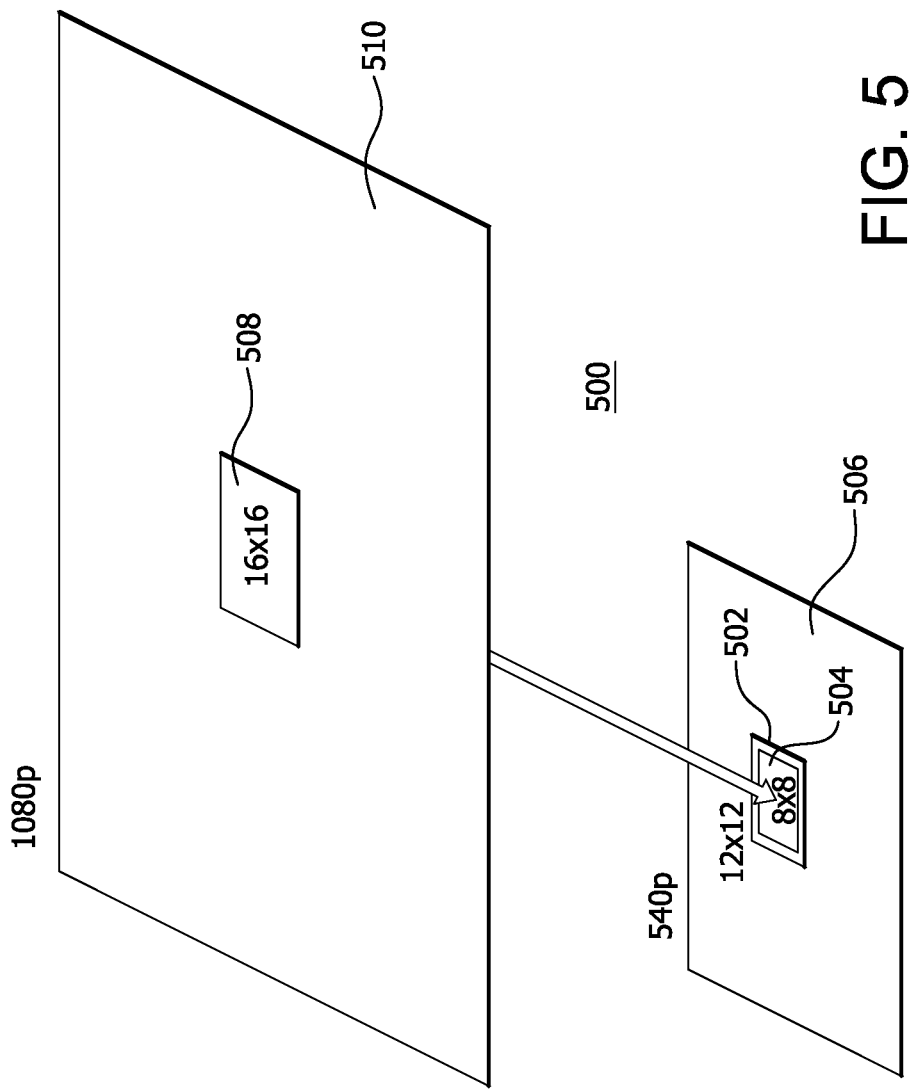
FIG. 5 is a diagrammatic view of an enhance and base layer according to the present invention.

With reference to FIG. 5, there is shown a 2× scale example 500 for the up-sampling. However, it will be understood that a 12×12 region 502 rather than a 8×8 region 504 in Base Layer 506 is needed to predict a 16×16 MB 508 in the enhance layer 510.

Figure 6:
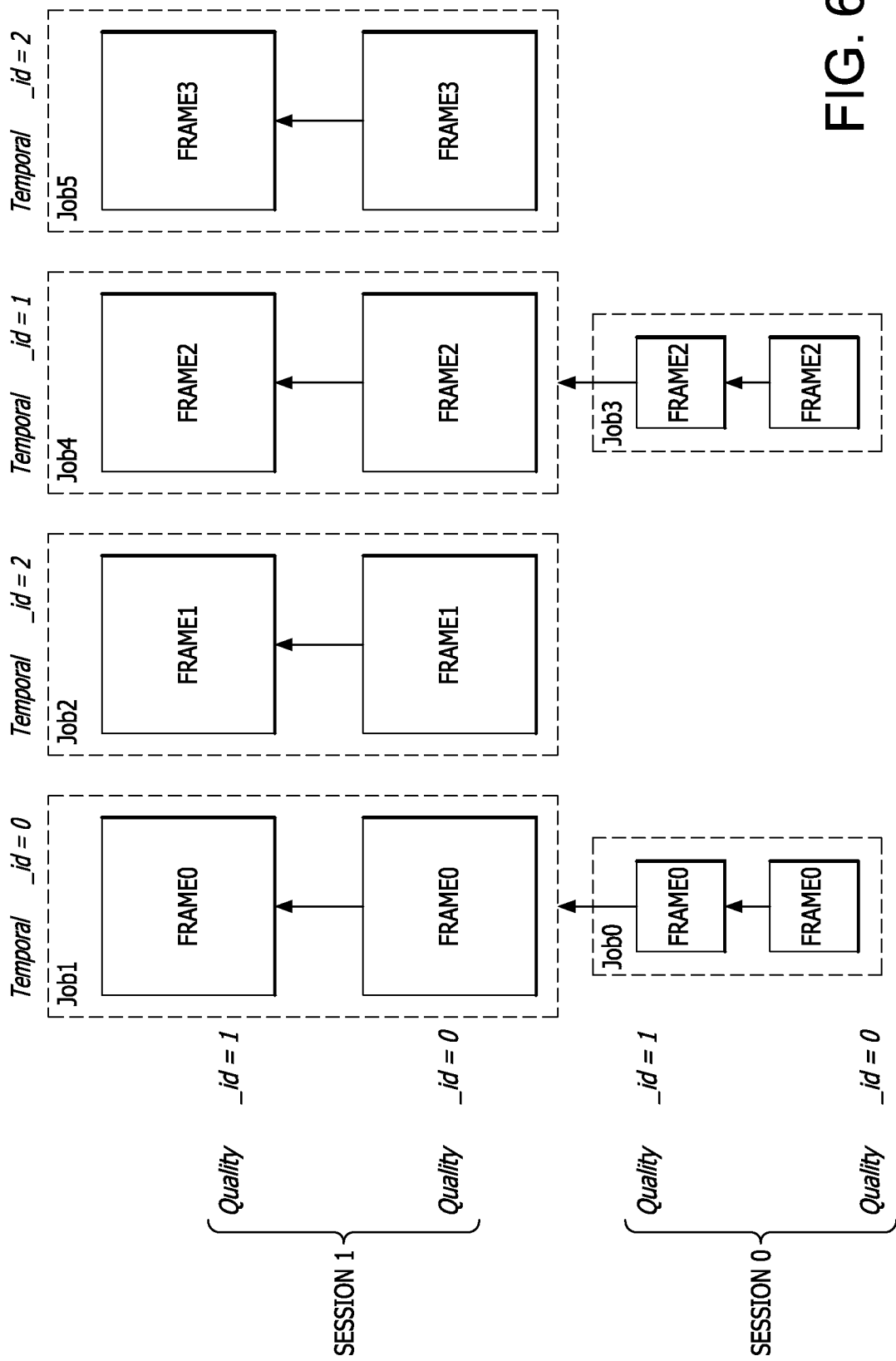
FIG. 6 is a block diagram of processed frames according to the present invention.

With reference to FIG. 6 shows the SVC implementation 600 on the frames, it contains temporal scale, quality scale and spatial scale. While the embodiments described herein only focus on the Spatial Scale. It will be appreciated by those skilled in the art that actually 2 sessions are used to implement Spatial Scale with time-division multiplexing.

For the first time slot in session 0, the lower resolution layer is encoded. And the interlayer data is saved into the memory.

For the next time slot in session 1, the same hardware encoder will fetch the interlayer data from the memory and begin encoding the higher resolution layer.

The Spatial Scale Residual/Reconstruction buffers can be classified into 2 parts; namely, the Inter Layer Residual/Reconstruction Buffer and the Sign Buffer for Inter Layer Residual.

The Inter Layer Residual/Reconstruction Buffer is as described with reference to FIG. 5, a 12×12 region is needed to interpolate a 16×16 MB in Enhance Layer. This may be understood that 2 additional pixels are needed in all the directions of top/bottom/right/left for a 8×8 block in the base layer.

In the encoder embodiments the data in the memory is saved in 8×8 granules, so actually, it will be appreciated that the needed region is 24×24 in the implementation.

With regard to the Sign Buffer for Inter Layer Residual, the sign buffer follows the same 8×8 store granule as described above.

With regard to these two buffers, the drive will check the encoder status; the Enhance Layer can only be encoded after the corresponding Base Layer is done.

Result for Bandwidth can seen from the example where one takes 540p@30 fps to 1080p@30 fps scaling as an example to show the bandwidth saving for residual and reconstruction data according to embodiments of this invention.

In this example, one has the following variables:

| Variable | Scaling Range |
|---|---|
| Picture width | 1920/960 |
| Picture height | 1088/544 |
| Frame size factor | 1.5 (1 for Y, 0.5 for UV) |
| Frame rate | 30 |
| Bit depth | 1/2 (1 for reconstruct, 2 for residual) |
| Picture width in MBs | (960/16) |
| Picture height in MBs | (544/16) |
| Bytes per MB for residual sign | (384/8) |

The bandwidth without any optimization (upscale in base layer, and both residual and reconstruction data will be sent to the memory):

Write: (1920*1088*1.5*1*30+1920*1088*1.5*2*30)/1000000=282M Bytes/s

Read: (1920*1088*1.5*1*30+1920*1088*1.5*2*30)/1000000=282M Bytes/s

The bandwidth after optimization becomes:

Write: (960*544*1.5*1*30+(960/16)*(544/16)*(384/8)*30)/1000000=26M Bytes/s

Read:
(960*544*1.5*1*30+(960/16)*(544/16)*(384/8)*30)*3/1000000=79M Bytes/s

As a result, the writing bandwidth achieves a 90% savings and the reading bandwidth achieves a 70% savings.

It will be appreciated that to further save memory, an additional option of compressing the output data with ZIP or other run-level compression tools may be used.

Finally, for the best performance, an internal buffer to eliminate data exchange with memory can be added. This is also achievable when the hardware is configured with a fast processor or as a heterogeneous computing platform described above.

In embodiments of the present invention, the hardware described above can be implemented using a processor executing instruction from a non-transitory storage medium. Those skilled in the art can appreciate that the instructions are created using a hardware description language (HDL) that is a code for describing a circuit. An exemplary use of HDLs is the simulation of designs before the designer must commit to fabrication. The two most popular HDLs are VHSIC Hardware Description Language (VHDL) and VERILOG. VHDL was developed by the U.S. Department of Defense and is an open standard. VERILOG, also called Open VERILOG International (OVI), is an industry standard developed by a private entity, and is now an open standard referred to as IEEE Standard 1364. A file written in VERILOG code that describes a Joint Test Access Group (JTAG) compliant device is called a VERILOG netlist. VHDL is an HDL defined by IEEE standard 1076.1. Boundary Scan Description Language (BSDL) is a subset of VHDL, and provides a standard machine and human readable data format for describing how an IEEE Std 1149.1 boundary-scan architecture is implemented and operates in a device. Any HDL of the types described can be used to create instructions representative of the hardware description.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A system configured to perform scalable video encoding comprising:
a memory; and
a processing unit, wherein the processing unit is configured to:
receive inter-layer data and a current picture, wherein the current picture has a base layer;
upsample the inter-layer data to generate residual data and reconstruction data, wherein the inter-layer data includes a base mode flag; and
encode the current picture to an enhanced layer using the upsampled inter-layer data based on a block type of the base layer and the base mode flag, wherein, based on the block type of the base layer, the base mode flag indicates whether the encoding uses the reconstruction data and whether a base layer motion vector is used for motion prediction.

2. The system of claim 1, wherein the inter-layer data is upsampled using a bi-linear filter to upsample the residual data in a base layer for a current block.

3. The system of claim 1, wherein the inter-layer data is upsampled using a 4-tap filter to up-sample the reconstruction data.

4. The system of claim 1, wherein the residual data is upsampled in a base layer for a current block.

5. The system of claim 1, wherein the current picture is encoded to the enhanced layer using residual data generated by subtracting a current block from up-sampled base layer reconstruction data when the block type of the base layer is set to intra and the base mode flag is set to true.

6. The system of claim 1, wherein, when the base mode flag is set to true, inter layer motion prediction is active, and a base layer motion vector is used as a predictor with a motion vector for a current macroblock equal to a motion vector predictor.

7. The system of claim 1, wherein, when the base mode flag is set to false, a base layer motion vector is used as a predictor.

8. The system of claim 1, wherein the processing unit includes one encoder.

9. The system of claim 1, wherein the processing unit includes a base layer encoder and an enhanced layer encoder.

10. The system of claim 9, wherein the base layer encoder is configured to generate the inter-layer data based on at least one frame and transmit the inter-layer data to the enhanced layer encoder.

11. A method for use in a processing system for performing scalable video encoding comprising:
receiving inter-layer data and a current picture, wherein the current picture has a base layer;
upsampling the inter-layer data to generate residual data and reconstruction data, wherein the inter-layer data includes a base mode flag; and
encoding the current picture to an enhanced layer using the upsampled inter-layer data based on a block type of the base layer and the base mode flag, wherein, based on the block type of the base layer, the base mode flag indicates whether the encoding uses the reconstruction data and whether a base layer motion vector is used for motion prediction.

12. The method of claim 11, wherein the inter-layer data is upsampled using a bi-linear filter to upsample the residual data in a base layer for a current block.

13. The method of claim 11, wherein the inter-layer data is upsampled using a 4-tap filter to up-sample the reconstruction data.

14. The method of claim 11, wherein the residual data is upsampled in a base layer for a current block.

15. The method of claim 11, wherein the current picture is encoded to the enhanced layer using residual data generated by subtracting a current block from up-sampled base layer reconstruction data when the block type of the base layer is set to intra and the base mode flag is set to true.

16. The method of claim 11, wherein, when the base mode flag is set to true, inter layer motion prediction is active, and a base layer motion vector is used as a predictor with a motion vector for a current macroblock equal to a motion vector predictor.

17. The method of claim 11, wherein, when the base mode flag is set to false, a base layer motion vector is used as a predictor.

18. The method of claim 11, wherein the processing system includes one encoder.

19. The method of claim 11, wherein the processing system includes a base layer encoder and an enhanced layer encoder.

20. The method of claim 19, further comprising generating, by the base layer encoder, the inter-layer data based on at least one frame and transmit the inter-layer data to the enhanced layer encoder.

* * * * *